(12) United States Patent
Steelberg et al.

(10) Patent No.: US 7,904,063 B1
(45) Date of Patent: *Mar. 8, 2011

(54) METHOD AND APPARATUS USING GEOGRAPHICAL POSITION TO PROVIDE AUTHENTICATED, SECURE, RADIO FREQUENCY COMMUNICATION BETWEEN A GAMING HOST AND A REMOTE GAMING DEVICE

(75) Inventors: Ryan S. Steelberg, Newport Beach, CA (US); Chad E. Steelberg, Newport Beach, CA (US)

(73) Assignee: Google Inc., Mountain View, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 12/326,877

(22) Filed: Dec. 2, 2008

Related U.S. Application Data

(63) Continuation of application No. 10/086,193, filed on Feb. 27, 2002, now Pat. No. 7,460,863.

(60) Provisional application No. 60/351,935, filed on Jan. 24, 2002.

(51) Int. Cl.
*H04M 3/42* (2006.01)

(52) U.S. Cl. .............. 455/414.1; 455/414.3; 455/456.3; 455/407; 455/411; 455/3.06; 463/39

(58) Field of Classification Search .......... 455/419–420, 455/456.1, 408, 414.1, 414.3, 456.3, 411; 342/357.01, 357.06; 463/39–42
See application file for complete search history.

(56) References Cited

U.S. PATENT DOCUMENTS

| | | | |
|---|---|---|---|
| 4,335,809 A * | 6/1982 | Wain ............................ | 463/20 |
| 4,517,562 A | 5/1985 | Martinez | |
| 5,038,022 A | 8/1991 | Lucero | |
| 5,096,195 A | 3/1992 | Gimmon | |
| 5,186,471 A * | 2/1993 | Vancraeynest ................. | 463/41 |
| 5,408,686 A * | 4/1995 | Mankovitz ................... | 455/66.1 |
| 5,697,844 A | 12/1997 | Von Kohorn | |
| 5,738,583 A | 4/1998 | Comas et al. | |
| 5,919,090 A * | 7/1999 | Mothwurf ....................... | 463/25 |
| 5,942,969 A * | 8/1999 | Wicks ........................ | 340/286.02 |
| 5,999,808 A | 12/1999 | La Due | |
| 6,001,016 A | 12/1999 | Walker et al. | |
| 6,011,973 A | 1/2000 | Valentine et al. | |
| 6,012,983 A * | 1/2000 | Walker et al. ................... | 463/20 |
| 6,036,601 A * | 3/2000 | Heckel .......................... | 463/42 |
| 6,104,815 A | 8/2000 | Alcorn et al. | |
| 6,190,256 B1 | 2/2001 | Walker et al. | |

(Continued)

FOREIGN PATENT DOCUMENTS

EP  1 032 148  8/2000

(Continued)

*Primary Examiner* — Sharad Rampuria

(57) ABSTRACT

Method and apparatus for providing authenticated, secure, communication between a gaming host communicating via radio frequency (RF) subcarriers to a remote user device in another location. Location of the remote user device and the host server are determined by accessing signals generated by either Global Positioning System (GPS) satellites, or by terrestrial radio broadcast stations, through a process known as radio frequency triangulation telemetry tracking (RF-3T). Player authentication (identity verification) is determined by use of a personal identification number (PIN). A remote user device may be implemented as a stand alone or self-contained single unit that is portable and can receive communications via radio frequency, or may be implemented as one or more discreet components adapted to be used with a laptop, a personal digital assistant (PDA), or desktop personal computer (PC).

8 Claims, 10 Drawing Sheets

U.S. PATENT DOCUMENTS

| | | |
|---|---|---|
| 6,198,906 B1 | 3/2001 | Boetje et al. |
| 6,212,392 B1 | 4/2001 | Fitch et al. |
| 6,227,974 B1 * | 5/2001 | Eilat et al. .................. 463/40 |
| 6,298,218 B1 | 10/2001 | Lowe et al. |
| 6,398,645 B1 * | 6/2002 | Yoseloff ...................... 463/19 |
| 6,416,414 B1 | 7/2002 | Stadelmann |
| 6,470,180 B1 | 10/2002 | Kotzin et al. |
| 6,508,710 B1 | 1/2003 | Paravia et al. |
| 6,509,867 B1 | 1/2003 | McGibney |
| 6,527,638 B1 | 3/2003 | Walker et al. |
| 6,527,641 B1 | 3/2003 | Sinclair et al. |
| 6,577,733 B1 | 6/2003 | Chjarrin |
| 6,585,598 B2 | 7/2003 | Nguyen et al. |
| 6,628,928 B1 | 9/2003 | Crosby et al. |
| 6,628,939 B2 | 9/2003 | Paulsen |
| 6,645,068 B1 | 11/2003 | Kelly et al. |
| 6,650,892 B1 | 11/2003 | Thiriet |
| 6,674,995 B1 | 1/2004 | Meyers et al. |
| 6,678,501 B1 | 1/2004 | Valeski |
| 6,735,435 B2 | 5/2004 | Newell et al. |
| 6,767,284 B1 | 7/2004 | Koza |
| 6,778,820 B2 | 8/2004 | Tendler |
| 6,811,484 B2 * | 11/2004 | Katz et al. ................... 463/17 |
| 6,834,195 B2 * | 12/2004 | Brandenberg et al. ..... 455/456.3 |
| 6,850,839 B1 | 2/2005 | Mcgibney |
| 6,857,959 B1 | 2/2005 | Nguyen |
| 6,893,347 B1 | 5/2005 | Zillacus et al. |
| 6,895,238 B2 * | 5/2005 | Newell et al. .............. 455/414.2 |
| 6,957,041 B2 | 10/2005 | Christensen et al. |
| 6,975,835 B1 | 12/2005 | Lake et al. |
| 7,035,626 B1 * | 4/2006 | Luciano, Jr. ................ 455/414.1 |
| 7,035,653 B2 * | 4/2006 | Simon et al. ................. 455/466 |
| 7,158,798 B2 * | 1/2007 | Lee et al. .................... 455/456.3 |
| 7,329,186 B2 * | 2/2008 | Griswold et al. ............... 463/29 |
| 7,460,863 B2 * | 12/2008 | Steelberg et al. ............. 455/419 |
| 2001/0003099 A1 | 6/2001 | Von Kohorn |
| 2001/0048748 A1 | 12/2001 | Van Ryzin |
| 2002/0168967 A1 | 11/2002 | Vlapper |
| 2003/0069032 A1 | 4/2003 | Jarvi et al. |
| 2003/0119528 A1 | 6/2003 | Pew et al. |
| 2003/0139190 A1 | 7/2003 | Steelberg et al. |
| 2003/0229559 A1 | 12/2003 | Panttaja et al. |
| 2004/0028388 A1 | 2/2004 | Kataoka et al. |
| 2004/0038723 A1 | 2/2004 | Schneier et al. |
| 2004/0064524 A1 | 4/2004 | Van Steenbergen et al. |
| 2004/0127199 A1 | 7/2004 | Kagan et al. |
| 2005/0267817 A1 | 12/2005 | Barton et al. |
| 2010/0130179 A1 * | 5/2010 | Colligan et al. ........... 455/414.1 |

FOREIGN PATENT DOCUMENTS

| | | |
|---|---|---|
| JP | 05-284162 | 10/1993 |
| JP | 09-018430 | 1/1997 |
| JP | 03-184486 | 8/1999 |
| WO | WO 93/15466 | 8/1993 |
| WO | WO 99/33076 | 7/1999 |
| WO | WO 99/49663 | 9/1999 |

* cited by examiner

METHOD AND APPARATUS USING GEOGRAPHICAL POSITION TO PROVIDE AUTHENTICATED, SECURE, RADIO FREQUENCY COMMUNICATION BETWEEN A GAMING HOST AND A REMOTE GAMING DEVICE

CROSS REFERENCE TO RELATED APPLICATIONS

The present application is related to and claims priority from U.S. provisional patent application Ser. No. 60/351,935, filed Jan. 24, 2002, U.S. provisional patent application entitled Method And Apparatus Using Geographical Position To Provide Authenticated, Secure, Radio Frequency Communication Between A Gaming Host And A Remote Gaming Device, filed Feb. 25, 2002, and U.S. patent application entitled Dynamic Selection And Scheduling Of Radio Frequency Communications, filed Feb. 14, 2002, all common owned with the present application, the entire contents of which are expressly incorporated herein by reference.

FIELD OF THE INVENTION

The present invention is directed generally to the field of radio frequency communications in, more particularly, to a management and distribution network connecting radio frequency broadcast centers for the purpose of delivering data to RF enabled remote devices and an RF enabled remote device with GPS capability for secure off-site gaming applications.

BACKGROUND OF THE INVENTION

Transmission of data via radio signals is an effective means of promoting communication between a variety of devices located within range of a radio signal transmitter. An advertiser, or other provider of data (including content) may pre-select a radio frequency carrier type (e.g. FM sub-carrier, AM sub-carrier, cellular, etc.) a broadcasting station (e.g. KIIS FM), and/or a frequency over which the data will be broadcast (e.g. 102.7 MHz@ 57 kHz RBDS) based on the geographic location of the target audience. The particular frequency may be chosen because of its popularity with the target audience, its spectrum availability, the type of device that is intended to receive the signals and, most importantly, because that particular transmitter's signals exhibit a large footprint (i.e., is able to cover or reach a large targeted audience).

Covering the target audience is deemed essential, but since many applications of radio frequency (RF) communications target an audience existing within a relatively small geographic area, target audience coverage is often not considered a problem. For example, it is common to broadcast music or news over a pre-selected frequency to all areas of an office building. Pre-selection of the frequency and pre-tuning of the receivers to that frequency is a relatively simple process. Another example of an RF communication within a relatively small area is a radio controlled model that is set to receive signals broadcast over a pre-selected frequency. Yet another example of selected target audience coverage is discussed in U.S. Pat. No. 6,298,218 to Lowe et al. which is directed to target audiences within a few feet of the transmitting device. The disclosure of the '218 patent is exemplified by an athletic club environment in which a user device receives different broadcasts on different frequencies depending on the user's proximity to specific pieces of gym equipment having embedded transmitters.

Thus, those applications that target audiences over a relatively small area typically work well with pre-selection of frequency and transmission station. Coverage becomes an issue and complications arise, however, when the target audience is spread over an area that encompasses more than one frequency, transmission station, and/or frequency band. These complications are due in part to the necessity to pre-select many, perhaps hundreds or thousands, of frequencies and stations in order to cover the entire target audience. Thus, pre-selection of frequencies becomes extremely burdensome when a widespread audience has been targeted.

And even further difficulty arises when it is understood that certain communication applications might be intended for use within specific geographic locations and whose use might be absolutely precluded outside of those locations. For example, an RF enabled gaming device might allow user to participate in a gambling activity, in conjunction with a broadcast gaming opportunity from a casino, for example. Since gaming is often a highly regulated activity and its participation is strictly limited to specific regions within a state or within specific states, any RF enabled gaming communication methodology must be able to differentiate between authorized and unauthorized participation. In summary, target audience coverage is not so much the issue as the physical location of each member of the target audience within a broadcast footprint.

By way of example, gaming is authorized within certain designated locations in the State of California (Native American Reservation Gaming, for example), while stringently controlled elsewhere. These locations have distinct and well defined boundaries, such that gaming might be authorized for a user standing in one spot, while criminally penalized for a user standing only a few feet away. Similarly, the boarder between the states of Nevada and Utah is equally sharp; a user on the Nevada side being authorized to participate in gaming activities, a user on the Utah side being penalized for such participation.

Accordingly, there is a need for systems and methods which facilitate the use of the RF transmission spectrum to communicate with RF enabled devices that may be spread over a relatively large area and, depending upon the form of content communicated to such devices, be able to differentiate the physical location of such devices within the relatively large area.

SUMMARY OF THE INVENTION

An electronic gaming system for enabling one or more player devices disposed at locations remote from a gaming source, where the devices receive communications from the gaming source, comprises an RF sub-carrier broadcast station, the station communicating game play signals developed by the gaming source. at least one player device is disposed at a first determinable location remote from the gaming source. The player device includes electronic game play means for enabling a player to make a wager by inputting wager data, and to commence game play by causing an activation signal to be received and processed. In one particular aspect, the player device is placed in condition to receive said activation signal by the device's first location being within a bounded authorized area.

The player device further includes an RF receiver configured to receive RF sub-carrier signals from the broadcast station and a microprocessor coupled to operate in cooperation with the RF receiver. Game software, hosted on the microprocessor, develops electronic data for driving a display means for generating graphical images depicting game play.

In a further aspect of the invention, the player device further includes an integrated circuit GPS receiver and a persistent memory store, the memory store containing data elements defining bounded authorized areas within which the player device is activated upon receipt of the activation signal. A player device GPS location is compared to permitted geographical locations for wagering contained in the memory store, the player device being put in an active condition for game play in the event of the GPS location and a permitted location forming an included set. GPS differential correction signal data may be received by RF sub-carrier signals issued from the broadcast station to generate a more precise device location.

In an alternative aspect, the player device includes a radio frequency triangulation telemetry tracking system, wherein radio frequency triangulation telemetry tracking data is received by RF sub-carrier signals issued from the broadcast station, the player device forming thereby an RFTTT derived location. A player device RFTTT location is compared to permitted geographical locations for wagering, contained in the memory store, the player device being put in an active condition for game play in the event of the RFTTT location and a permitted location forming an included set.

According to a particular feature of the invention, the RF sub-carrier signals are broadcast on a band selected from the group consisting of an FM sub-carrier band, an AM sub-carrier band, a Television sub-carrier band, a satellite band, and a cellular band. The player device may be configured as a smart card, a stand-alone purpose-built electronic gaming device, or as a gaming component set adapted for use with a laptop, a personal digital assistant (PDA), or desktop personal computer (PC).

In particular, a remote gaming device includes a receiver programmed to accept radio signals broadcast at a frequency selected by a network node, the frequency residing within at least one of an FM sub-carrier band, an AM sub-carrier band, a Television sub-carrier band, a satellite band, and a cellular band, the gaming device further including location determination means for establishing whether the device is physically within a gaming authorized region, wherein the gaming device is activated for game play only when its physical location is within the gaming authorized region.

A method for electronic gaming at locations remote from a gaming source comprises the establishment of a broadcast station, the station broadcasting game play data in accordance with instructions received from a gaming source. A remote player device is provided, the player device receiving game play data from the broadcast station, the player device executing game play software under microprocessor operational control. A location determination system establishes a physical location of the player device and the device is placed in condition to receive game play data if an established physical location corresponds to an authorized gaming area.

The player device is registered with a network node authority, a user inputting at least a unique device serial number and a personal identification code. The device is activated for use by receiving a signal over an RF sub-carrier channel a credit balance for wagering is established, the credit balance contained within the device's persistent memory store. A physical location of a player device is determined and the determined location is compared to at least one of a multiplicity of authorized gaming locations. The device is placed in condition to operate when the determined location corresponds to an authorized gaming location.

In an additional aspect, game play data is broadcast to a plurality of player devices in simultaneous fashion and the game play data is processed in each device of the plurality by mathematical combination of the game play data with each device's unique serial number so as to generate uniquely random game play data for each device of the plurality. A wager result is recorded for each device of the plurality, for each set of game play data and a resulting increment or decrement to the credit balance is stored on each device of the plurality depending on the outcome of game play.

BRIEF DESCRIPTION OF THE DRAWINGS

These and other features, aspects and advantages of the present invention will be more fully understood when considered in connection with the following specification, appended claims and accompanying drawings wherein:

DETAILED DESCRIPTION OF THE INVENTION

Figure 1:
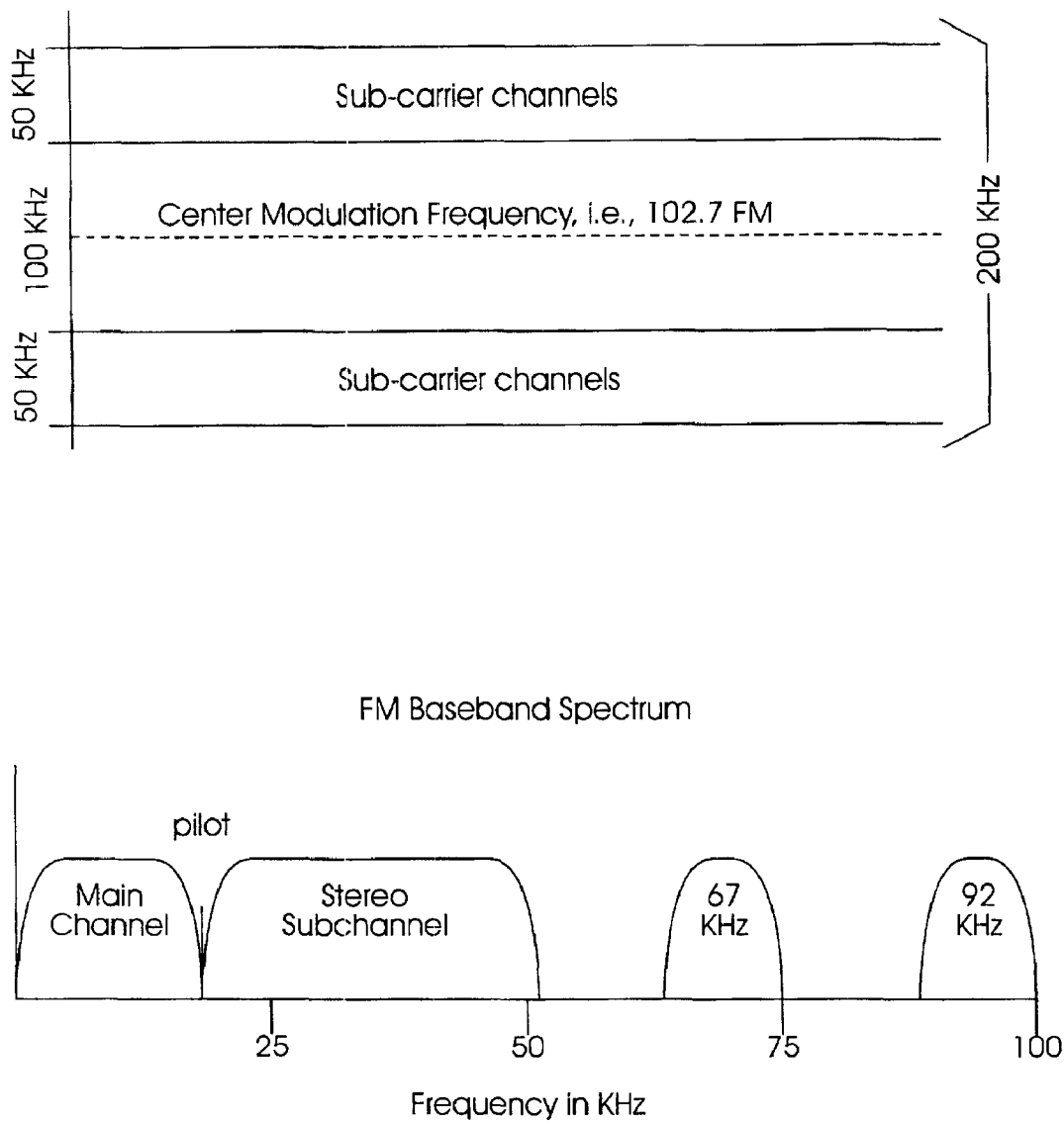
FIG. 1 is a simplified, semi-schematic diagram of primary and sub-carrier channel bands within an exemplary frequency modulation (FM) spectrum.

The systems and methods of the present invention are predicated upon the dissemination of data over radio frequency (RF) transmission spectra to an RF enabled user device. In the context of the invention, is considered to be any remote device that is capable of receiving and RF feed and performing an application or operation upon the basis of data acquired in such a fashion. Remote devices might be typified by certain consumer electronic devices, such as a VCR, PDA, a processor enabled toy, or PM3 player. A remote device might also be a home appliance, such as a refrigerator, telephone, microwave oven, electronic thermostat or the like, or might be embodied as a Smart Card. Any time of remote device that is able to support reception of RF broadcast information qualifies as a remote device for purposes of this specification.

One particularly one important aspect of a remote device is the ability to be provided with an RF receiver. A resident receiver should be capable of being set for one of a plurality of channels or, preferably, be capable of scanning for active frequencies within designated frequency bands. A receiver scans for active frequencies only within certain frequency bands to which it has been granted access. As such, it is preferable that an RF receiver is capable of being updated remotely, by RF broadcast, in order to adaptively identify allowable frequency bands within the transmission spectrum on a location-by-location basis.

As will be described in greater detail below, an integrated circuit electronic chip, or chip set, residing on or in the remote device is able to control the RF receiver, parse incoming data, and further be capable of triangulation or position location, as well as control data dissemination, flow and presentation. A primary function of the integrated circuit chip or chip set is to allow the remote device to gain additional functionality through interaction with an RF communication source. An additional feature of such a chip or chip set includes its ability to transmit short range communications (by e.g. 802.11 or Bluetooth communication standards) to enable tracking and confirmation of transmissions and to rebroadcast transmissions to other remote devices within range.

RF communications are sourced by regional broadcast stations, which might include AM stations, FM stations, and TV stations. In the exemplary embodiment of a regional broadcast station broadcasting over the FM transmission spectrum, and with regard to the illustration of FIG. 1, RF broadcasts, in the context of the invention, are accomplished over sub-carrier channels residing in frequency bands above and below the characteristic modulation frequency of any particular station. In particular, primary FM radio stations are typically granted a 200 KHz frequency spectrum centered about their broadcast modulation frequency thus, FM radio stations reside at odd numbered frequencies, such as 97.1, 97.3, 97.5 . . . etc., indicating that their center frequencies are offset by one another by 200 KHz. The audio information portion is typically L+R and has a maximum audio deviation of approximately 15 KHz, which is generally considered suitable for audio fidelity. L-R information is needed to restore stereo information for users with stereo radios and is typically transmitted in sub-channel areas above and below the 38 KHz channel as DSB information. Since the stereo carrier is transmitted as a weak signal at 19 KHz, as audio is detected, the 19 KHz signal is doubled to 38 KHz and combined with the L-R signal so that stereo channels are available.

Accordingly, it will be understood that a considerable portion of the 200 KHz band is available for sub-channel signal transmissions. Sub-channel signals are still in the audio spectrum, but reside high above the L-R signal (conventionally in the 67 KHz and 92 KHz regions) utilizing FM modulation rather than DSB. The audio limit on sub-channel communications is about 5 KHz, such that sub-channel transmissions are not considered high fidelity. However, with a 100 KW FM class C station, a reception radius of about 50 miles is quite realistic under nominal atmospheric conditions. Class A stations necessarily will achieve a much greater reception footprint.

It should be understood that the foregoing discussion has been predicated on a signal, or set of signals, modulated about a particular center frequency being mixed down to baseband, with particular frequency designations referred thereto. In more practical terms, an FM stereo broadcast signal occupies an approximately 100 KHz band centered about the primary carrier band, with an approximate 50 KHz band above and below the audio feed available for use by sub-carrier signals. Although it is desirable to have sub-channel communications reside at a particular frequency (i.e., 67 or 92 KHz) for acquisition and lock, and RF receiver can be programmed to scan the sub-channel band and acquire and lock to any signal utilizing those channels, as is well understood by those having skill in the art.

Figure 2:
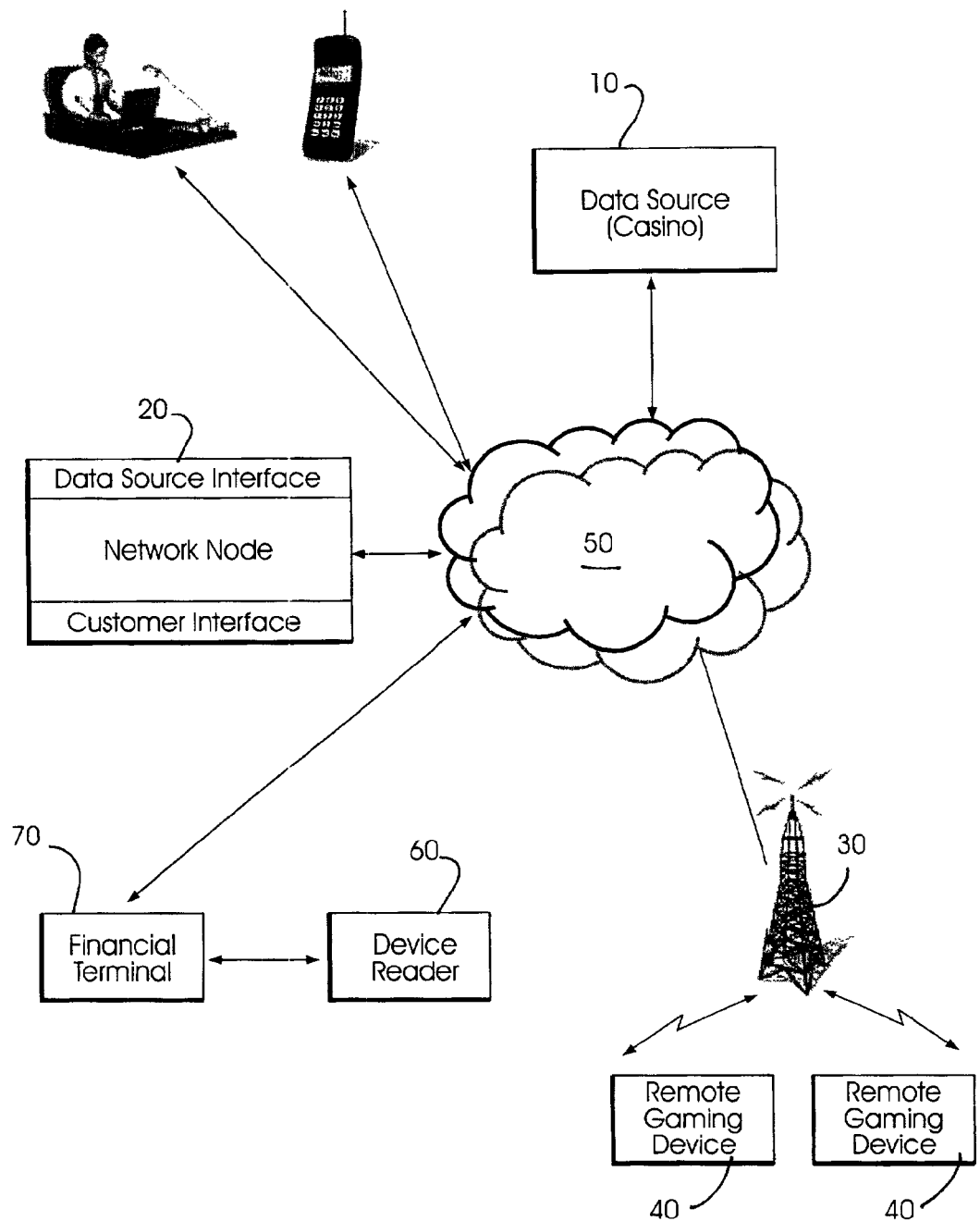
FIG. 2 is a simplified, semi-schematic block level diagram illustrating the primary infra structure components and basic data flow of an RF communication system in accordance with the invention.

Turning now to FIG. 2, there is depicted a semi-schematic block level diagram illustrating the primary infrastructure components and basic data flow of an RF enabled communication system in accordance with the invention. In its simplest embodiment, the system includes a data source 10, a network node 20, at least one regional broadcast station 30, and at least one remote device 40 capable of receiving data from the regional broadcast station 30. In the context of the invention, a data source 10 is considered to be any entity that is able to provide data to the network node 20 for eventual communication to a remote device 40. A data source might be a second remote device, a manufacturer or supplier of remote devices, or a third party such as an advertising agency that has no direct relation to the manufacture, distribution, or sale of a remote device. A data source might simply be an entity which desires to provide information to a plurality of remote devices and might be one of several contemplated sources, such as manufacturers, distributors, retailers, advertisers, news services, casinos, automobile dealers, software companies, and the like.

A network node 20 generally comprises a plurality of data processing units, such as servers, that might be connected to data sources and regional broadcast stations through a wide area network, such as the Internet 50. The network node 20 might be implemented as a centralized server, but might also be implemented as a distributed set of servers, each communicating with the other over a network connection. Further, and in the context of the invention, network nodes might be geographically distributed and mirrored, such that processing capability might be adaptively configured for particular geographic locations.

Whether a device is classified as a network node 20 generally depends upon a device's functionality. A device which is able to schedule broadcasts or select broadcast frequencies is regarded as a network node regardless of its particular location or connection methodology to the network. Certain additional functions of the network node include selection of a broadcast frequency, selection of a regional broadcast station, management of broadcasts, management of data on the servers, management of data at the regional broadcast stations, additional and alternative scheduling at the regional broadcast station, and communication of data to regional broadcast stations. Network nodes are further responsible for encoding of data onto radio signals at both the node and at a regional broadcast station. A particular feature of a network node 20 is its ability to target remote devices (e.g., by serial number, lot number, location, demographic information, physchographic information or metadata parameters). Network nodes are also responsible for partnering with broadcast market participants in the sale of electronics and RF broadcast spectrum space and particularly the establishment of regional broadcast stations 30 that are able to cover specific target markets.

In the exemplary embodiment of FIG. 1, data is communicated from a data source 10 to a network node 20 and thence to a remote device 40 through a regional broadcast station 30. In addition to data that has been supplied by a data source 10, communications to regional broadcast stations may also expressly or impliedly include a frequency and an identification of a regional broadcast station 30. Data enters the system as a result of a communication between the data source 10 and a network node 20 and is implemented as an asynchrinist communication of digital data over the Internet 50. Although data is likely to eventually arrive at a network node 20, this is not a requirement, since data may be communicated directly from a data source 10 through a regional broadcast station 30 based on a schedule developed by a network node 20.

Preferably, the data that flows to a regional broadcast station 30 traverses wired and/or wireless paths of the Internet 50, while data that flows from a regional broadcast station 30 traverses wireless paths. It is contemplated that data sent to a regional broadcast station 30 is either pre-encoded into RF signals at a network node 20 or is encoded into RF signals at a regional broadcast station 30. Pre-encoding may include modulating data for communication pursuant to known CDMA, TDMA, GSM, and GPRS technologies. Additionally, it is contemplated that more than one broadcast may be utilized in coordination (i.e., multiplexed), to disseminate RF encoded data that might be reasonably large for a single primary or sub-carrier channel to accommodate.

With respect to a regional broadcast station 30, it is contemplated that such stations are those capable of broadcasting radio signals within the AM, FM, TV, cellular/PCS, and satellite bands. A key function administered by a network node 20, but preferably performed at a regional broadcast station 30, is encoding the data into RF signals that may be broadcast as radio waves having a broadcast frequency matching the network node selected frequency. An RF generator is employed to encode the data for RF broadcast in accordance with the selected frequency.

A regional broadcast station 30 contracts with a network node 20 to broadcast data. It is preferred that a plurality of regional broadcast stations be contracted such that a substantial geographic area is covered. From among the plurality of regional broadcast stations, a set of available frequencies is compiled. A set of available frequencies generally comprise the frequencies made available by regional broadcast stations for remote broadcasting of data. In addition to a frequency, other information will be included in a set of available frequencies such as the regional broadcast station identifier, station power, transmitter location, range, and performance related information.

When a regional broadcast station receives a selected frequency from a network node, an opportunity is generally provided for the selected regional broadcast station to override the selected frequency to an alternate or even to decline to make a broadcast altogether. Decisions to select an alternate or decline to broadcast are preferably made automatically by network node software residing at a remote broadcasting station and may be based upon local factors. Decisions made at a regional broadcast station are transmitted back to the network node 20 over an Internet 50 connection for inclusion in the scheduling process.

The foregoing system is particularly suitable for use in connection with a remote device configured as a wireless gaming device, and adapted to receive broadcasts that initiate and implement a virtual gaming experience. For example, and in a manner that will be described in greater detail below, a remote wireless gaming device is particularly suitable for participation in certain forms of electronic card games, as well as functioning as a virtual "slot machine", all in conjunction with RF broadcast "hands" that afford a unique display for each participating individual.

In the context of the invention, and with reference to the exemplary block level diagram of FIG. 2, a data source 10 is exemplified as a casino or some other institutional entity which is authorized to host gaming services. The data source 10 necessarily is the primary host of the enterprise and determines the type and number of gaming services that it wishes to provide to users of remote devices over regional broadcast station. The security, authorization and financial interface between the data source 10 and the user of a remote device 40 is provided by the network node 20 which also controls registration, validation, activation and redemption procedures.

Implicit in the use of the system in a gaming context is a financial terminal 60 which might be implemented as a casino cashier or as a third party cashier service, such as a convenience store, or the like, by which means cash or credit redemption is effected. A remote device reader 70 is used to physically record a transaction at a financial terminal 60 and is able to provide an additional degree of authentication or verification of gaming transactions, as will be explained in greater detail below. Credit and cash transfer transactions are made between and among the financial terminals and the data source through operational control the network node 20.

Figure 3:
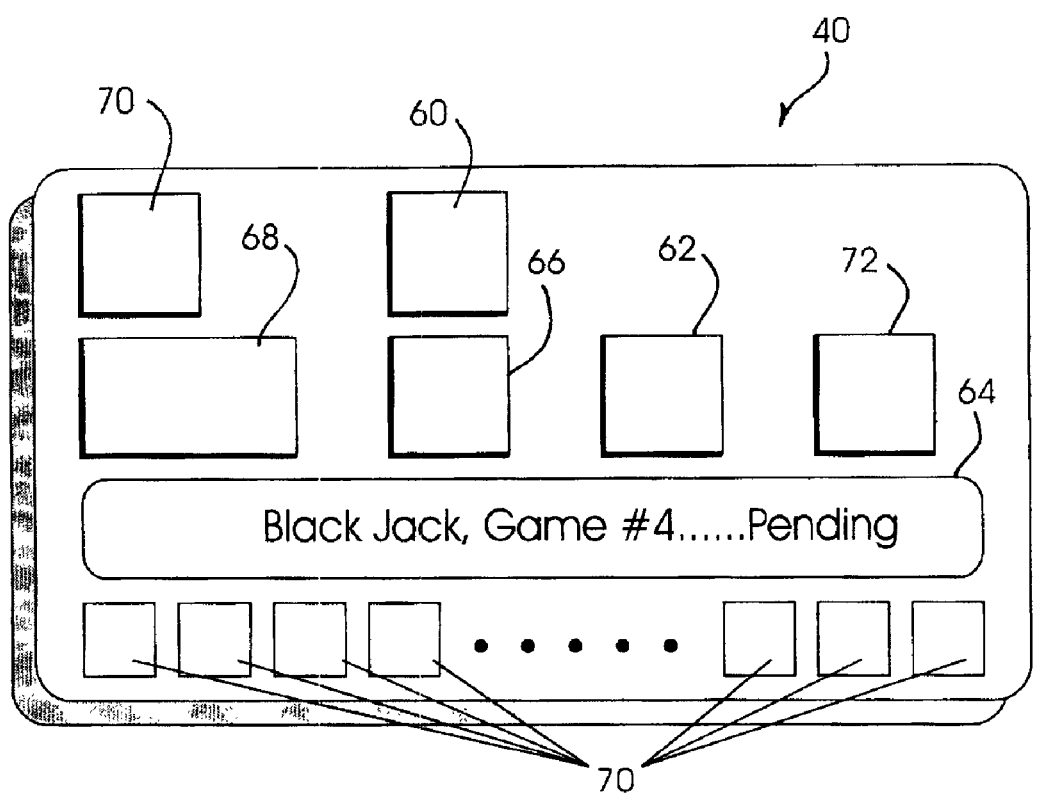
FIG. 3 is a simplified, block level diagram of one embodiment of a remote gaming device, including GPS capability, in accordance with the present invention.
Figure 3:
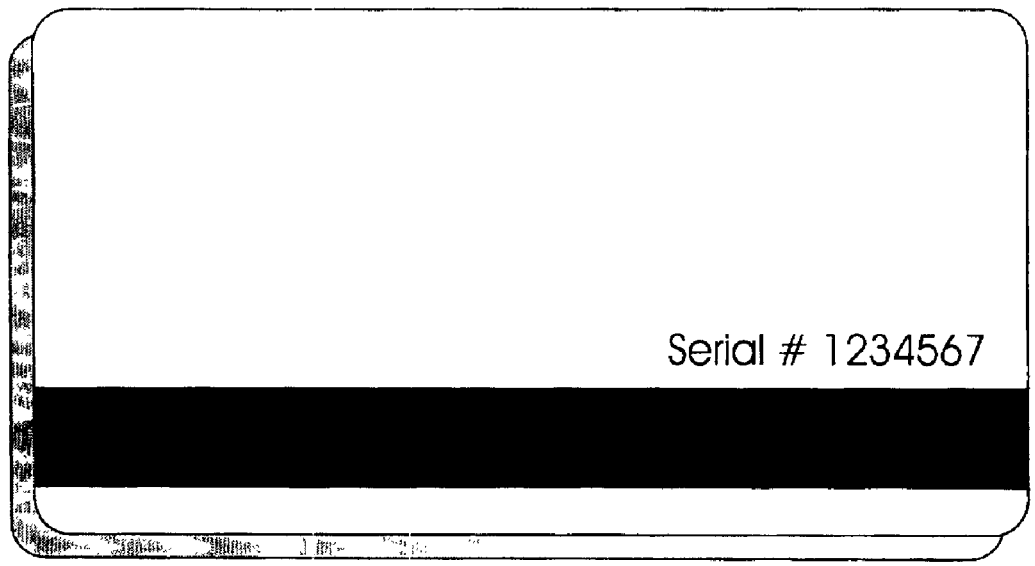

Turning now to FIG. 3, there is depicted a particular embodiment of a remote gaming device, including a location identifier, in accordance with the practice of the present invention. Specifically, the remote gaming device is implemented as a smart card and comprises an RF receiver/decoder integrated circuit 60 operating in conjunction with a system microprocessor integrated circuit 62 so as to receive RF gaming broadcasts, process the information and display the information on an LED or LCD integral display screen 64.

Information relating to authorized frequencies accessible to the RF receiver 60 are contained in a secure persistent memory storage circuit 66, such as a PROM. Persistent memory is required such that certain gaming statistics, as well as validation and authentication information (PIN numbers, for example) is maintained over time. The memory circuit 66 is programmable such that different frequency bands might authorized to the RF receiver 60 as a user moves from place-to-place and passes from one RF broadcast footprint to another.

Power is provided to the integrated circuit devices comprising the remote gaming device 40 by a thin film battery 68 that may be provided either alone, or in combination with a thin film solar panel 70. Solar panel 70 functions as an alternative power source and as a source of recharging current for the thin film battery 68.

The microprocessor 62 includes an instruction stack which hosts game software which, when processed by the microprocessor develops electronic data for driving the display 64 that generates graphical images depicting game play. A set of touch sensitive buttons or pads (collectively identified at 70) allows user interaction with the game software in a manner that will be described in greater detail below. Users are able to activate a game and select various functions provided within the game by accessing one or more of the designated touch sensitive pads 70 in a sequence devised by the game software.

In an alternative embodiment, the remote gaming device 40 further comprises a location determination circuit 72 which is coupled to provide user location data to the device's primary microprocessor 62. Location determination is made by various means, including radio frequency triangulation telemetry tracking and global positioning system data acquisition, but may indeed include any electronic location determination methodology capable of being implemented on a smart card-like remote gaming device.

Location determination is a primary function of the remote gaming device 40 of FIG. 3, since the ability to participate in gambling activities is predicated upon a user's physical location. A user is either physically located within a bounded region, within which gambling is authorized, or is not so physically located. In order to comply with the various local, state and national ordinances relating to gambling activities, it is necessary for the system to determine whether the user is physically co-located with an authorized gambling space.

In accordance with the invention, the remote gaming device 40 is issued by a data source (10 of FIG. 1) such as a particular casino or gaming organization, that is authorized to operate within a designated geographical space. Casinos are able to operate within the confines of the State of Nevada, for example, without restriction as to location, so long as they are so licensed. In contrast, only particular casinos, owned and operated by particular entities, are authorized to offer gambling, but only in narrowly restricted geographical areas (North American Indian Reservations in California, for example). Each issuing authority (data source) is able to provide a data set of geographical delimiters to the remote gaming device 40, with the delimiters defining the physical footprint of the area in which they are authorized to operate. Location delimiters are contemplated as being provided in the form of latitude/longitude defined boundaries or, alternatively, as a centrum datum associated with a radius datum. As will be evident from further description, a latitude/longitude definition is more application to the present invention, since it allows for ease of calculation of a user's location within a bounded geographical area, based upon a device's sensed location through use of global position system (GPS) information.

It will be understood by those having skill in the art that although the remote gaming device has been described in connection with an implementation as a stand alone or self-contained single unit that is portable and can receive communications via radio frequency, the device may alternatively be implemented as one or more discreet components adapted to be used with a laptop, a personal digital assistant (PDA), or desktop personal computer (PC). Further, when implemented as a stand alone unit, the device may be implemented using contact or contactless technology or with a wireless interface such as RF induction. Information, programs, and other data may be imported or exported, and power might be provided through RF induction as well as through the above described battery and solar cell assist methodology. For communication assurance, a thin film antenna may be wound about the periphery of the device or, alternatively a set of contacts may be provided that allow for coupling to an external powered or unpowered antenna system.

Figure 4A:
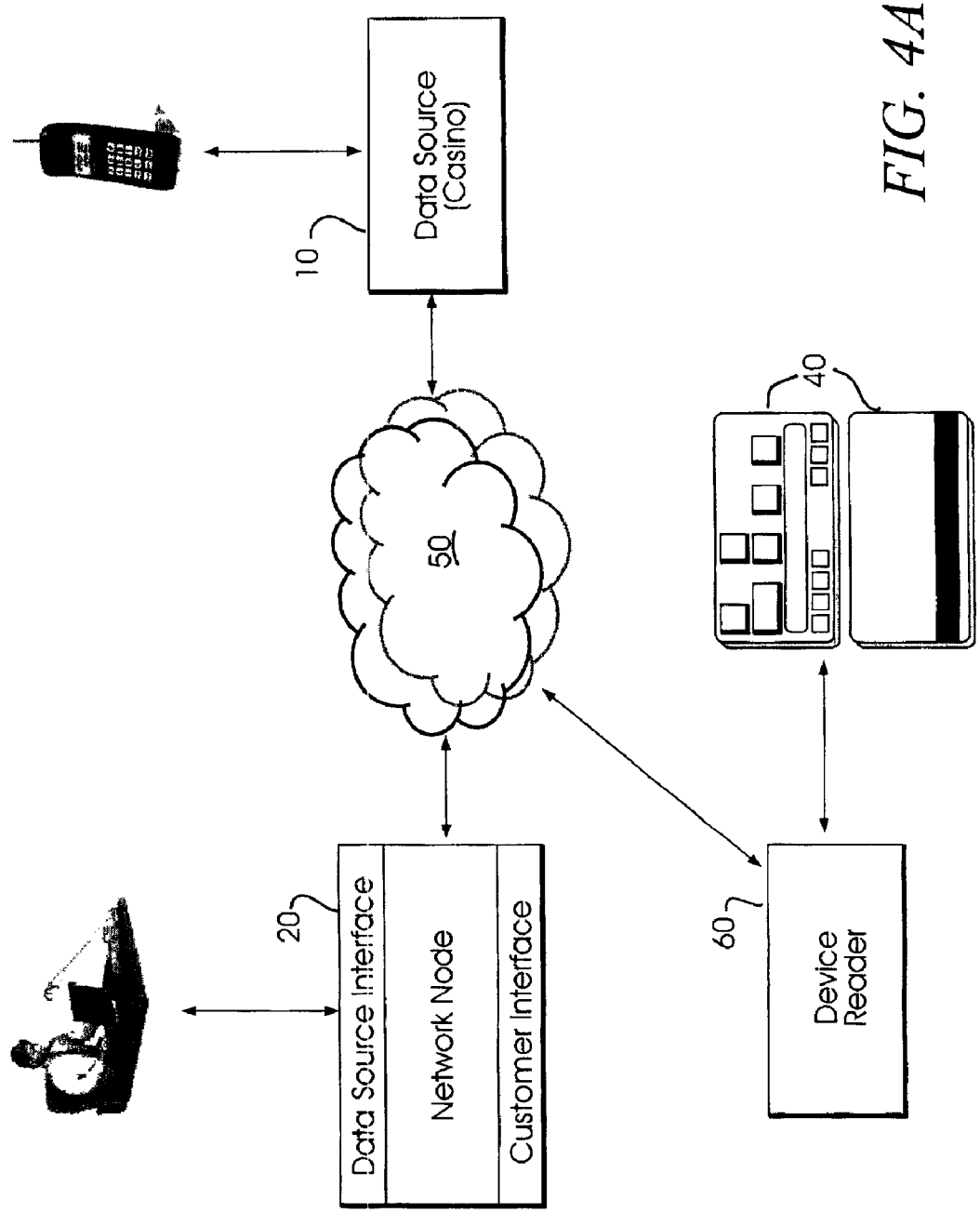
FIG. 4a is a simplified, block level diagram of a gaming device purchase and registration procedure.
Figure 4B:
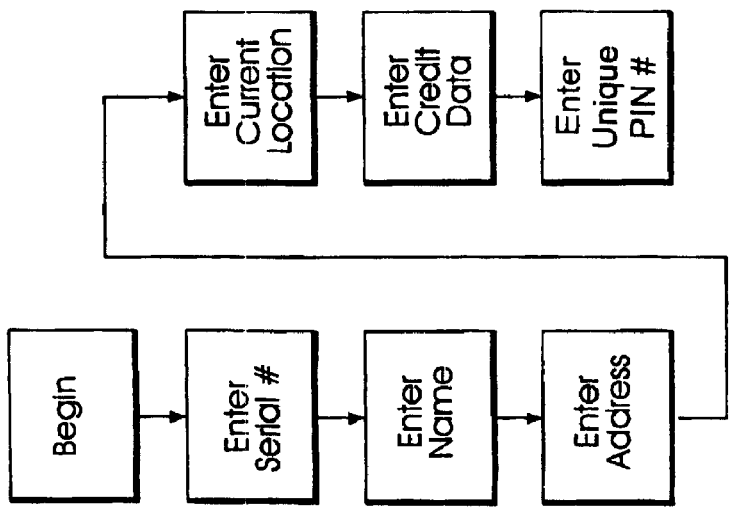
FIG. 4b is a simplified, flow diagram of a gaming device purchase and registration procedure.

Turning now to FIGS. 4a and 4b, remote gaming device purchase and registration occurs by a consumer purchasing the device at a participating casino or retail outlet. The wireless device may be purchased with an established cash balance, in a manner similar to purchase of pre-paid phone card, or the wireless device may be purchased with a zero cash balance, with the cash balance being established and updated at a later time. Card activation is made through an affinity partner, with the consumer required to register the card with an associated network node (20 of FIG. 1) which oversees the gaming process. Registration is performed through a device reader (70 of FIG. 2), over a conventional Internet connection to an established domain space of the network node 20, or by telephonic connection with either the data source (casino) or the network node. In order to activate a remote gaming device and establish a cash balance, the user must provide the following information: the device's serial number, the user's name, home address and present location (at point at activation). The user must also provide credit card or check card information, as well as their age, optional demographic information and establish a personal identification number (PIN). In accordance with the invention, the device's serial number is provided on a magnetic strip disposed on the back surface of the card, with the strip being able to be recorded with the additional information provided by the user during the registration process. At this time, a clerk is able to verify certain information such as the user's age. Alternatively, the device's serial number may be printed, embossed or other wise provided on a visible surface of the device such that the user is able to enter the serial number when registering the device by phone or over an Internet connection. When so registering the device, the user enters the other required information in conventional fashion, with the network node retaining such information until such time as the card is presented for game play, whence that data is recorded onto the device.

It should also be understood that the device is not required to be provided with a magnetic stripe, but might retain this information in memory, with the memory being programmed by a reader (70 of FIG. 2) that accesses the device through contact or RF induction technology.

Figure 5B:
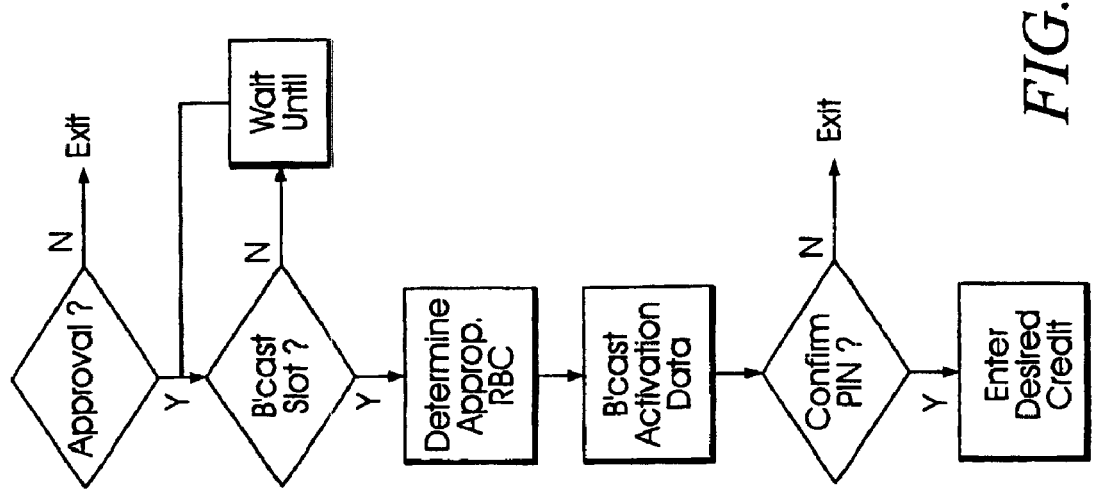
FIG. 5b is a simplified, flow diagram of an exemplary gaming device activation and cash balance addition procedure.

With regard now to FIGS. 5 and 5b, once the data source (casino) or network node has approved the consumer's registration information, the novel system schedules the card's activation through a secure, RF broadcast network. At the next available opportunity, typically averaging approximately five minutes between the time of registration and the time of activation approval, the network node directs a regional broadcast station most proximate to the customer's present location, to broadcast a set of encrypted commands which activate the device identified by the respective device serial number. Once the activation signal is detected and processed by the device's RF receiver 60 and microprocessor 62, the device, under operational software control, prompts the consumer to enter their PIN number by depressing the corresponding ones of the touch sensitive pads or buttons 70 disposed on the surface of the card.

Upon PIN confirmation, a consumer is able to add a specified credit amount to a remote gaming device 40 through a secure and encrypted process. In one embodiment of the invention, a credit amount is entered by depressing appropriate ones of the touch pad or buttons 70, thereby selecting a dollar figure with which the consumer intends to game. The dollar figure is associated to the consumer's preferred payment method and the resulting data is maintained in memory 66 until such time as the card is passed through an appropriate reader at a financial terminal. Alternatively, the consumer selects the dollar figure either through telephonic or Internet communication means with the casino or network node, and the requisite dollar figure is broadcast to the device identified with the corresponding serial number, whence it is stored in memory as the consumer's "stake."

Figure 6:
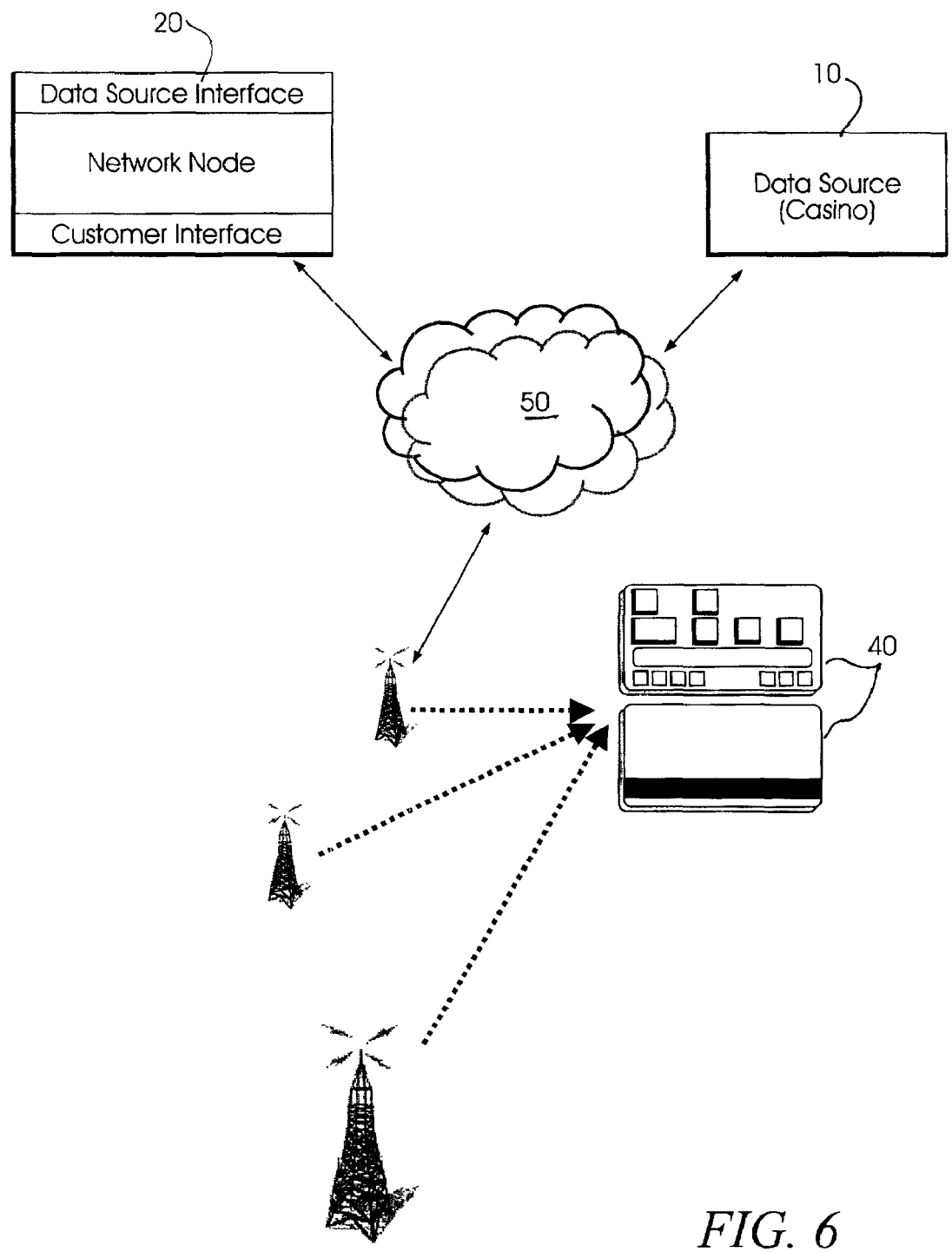
FIG. 6 is a simplified, block level diagram of a location verification system utilizing radio frequency triangulation telemetry tracking.

With regard now to the exemplary embodiment of FIG. 6, during the initial activation broadcasts, the network node provides certain relevant consumer data to the appropriate regional broadcast station for broadcast to a particular user's remote gaming device. Consumer data, including user location data and initial gaming decoding algorithms are stored in memory 66 of the gaming device 40. Location data is adaptively configured to define authorized gaming locations in regions most proximate to the consumer's present physical location. If, for example, the consumer purchased the device, and registered the device, at a casino within an Indian Gaming Reservation, the location data provided to that device would be the geographical boundary confines of the Gaming Reservation within which gambling is authorized.

Similarly, if the device was purchased and registered within the confines of the State of Nevada, and particularly in that region of Nevada proximate to California at Lake Tahoe, the location data transmitted to that device would delineate the boundary between Nevada and California in that region.

Once the remote gaming device detects receipt of location data (i.e., receives a regional geo-positioning map), its embedded RF receiver 60 begins polling the sub-carrier channels and listening for location triangulation data. Searching for triangulation data involves use of a reliable and well understood process conventionally termed radio frequency triangulation telemetry tracking (RFTTT) which is currently utilized by logistics firms and trucking companies. By referencing broadcast triangulation data with the embedded location file, the remote gaming device is able to verify its exact location, down to a ten meter radius, at any time interval required. The ability to verify its location to within an authorized regional geo-positioning map is an important function for the device, since game play cannot take place unless and until the device's physical location is contained within the authorized area.

If a location is verified as being an authorized location, a simple "bit" is set in a microprocessor register which allow the microprocessor to activate the game software. If there is no co-location match, the "bit" is not set and game play is not allowed to proceed.

Figure 7:
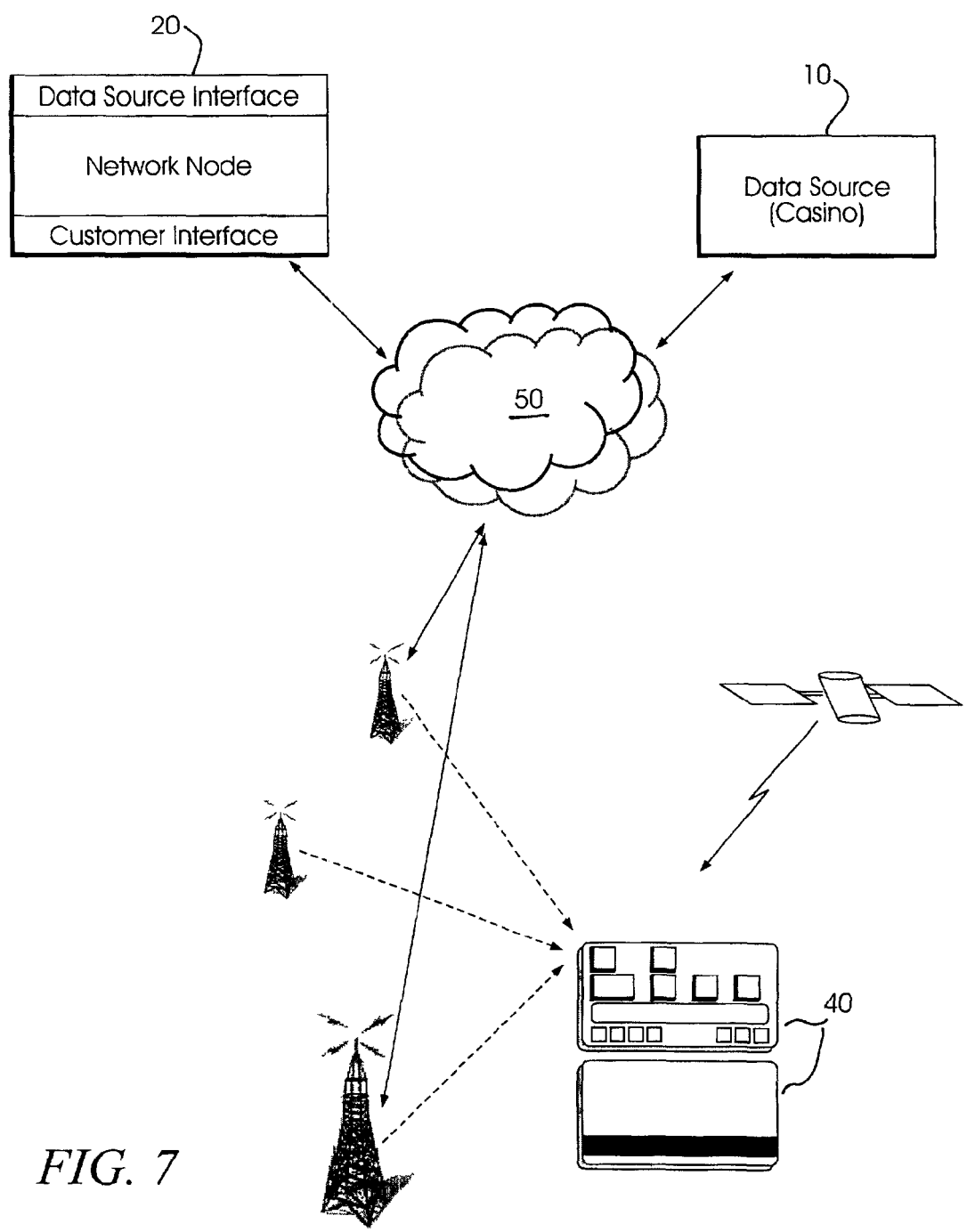
FIG. 7 is a simplified, block level diagram of a location verification system utilizing GPS/DGPS.

An alternative embodiment of the position location system is depicted in the exemplary diagram of FIG. 7, in which the optional GPS chip (72 of FIG. 3) embedded in the device performs the function of primary device location with respect to global latitude/longitude referents. The device may utilize either an embedded GPS chip alone or utilize an embedded GPS chip in combination with differential correction signals provided as a serial byte stream over appropriate sub-carrier channels by a corresponding regional broadcast station.

With selective availability no longer an issue, a stationary GPS, without differential correction signals, will exhibit an approximate 20 meter error radius for a "random walk" pattern. The same GPS receiver with differential correction signals would reduce the error to an approximately two meter average radius.

Although discussed in connection with DGPS information broadcast over sub-carrier channels, it should be noted that standard DGPS broadcasts are conventionally made through a number of established sites throughout the United States, at 100 bps and 200 bps rates in the 290 KHz to 319 KHz bands. Either transmission methodology is contemplated by the present invention.

Figure 8A:
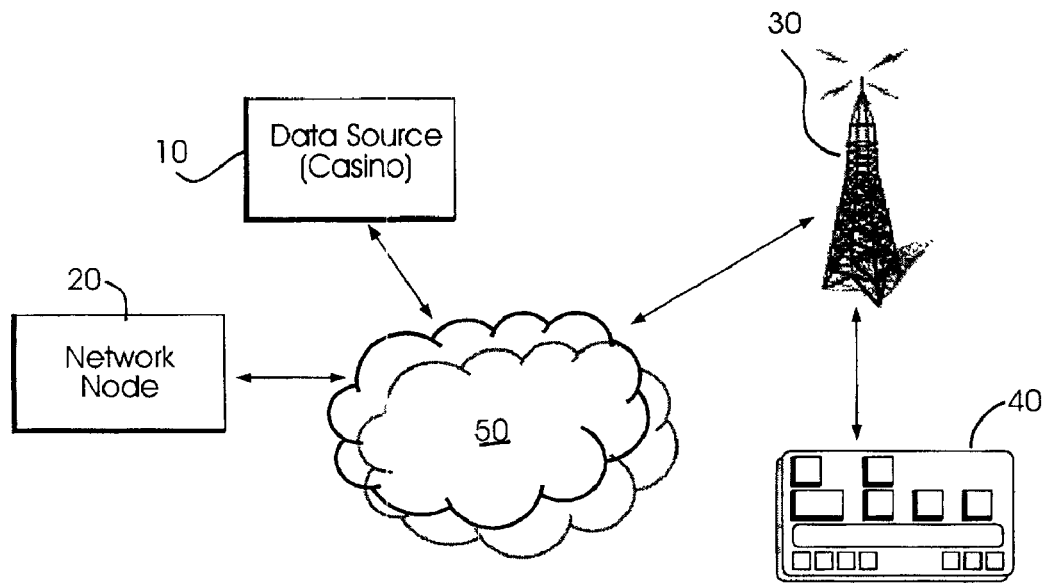
FIG. 8a is a simplified, block level diagram illustrating game play in accordance with the invention.
Figure 8B:
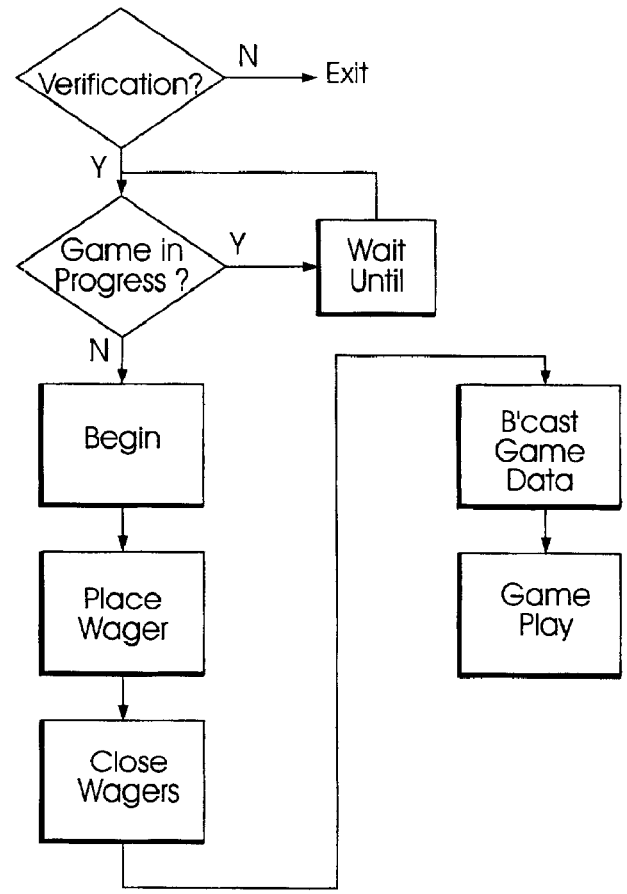
FIG. 8b is a simplified, flow diagram illustrating game play in accordance with the invention.

Having reference now to the exemplary embodiments of FIGS. 8a and b, once a remote gaming device has been activated, its location verified and a valid PIN number confirmed, the device may now be utilized to access and bet on real-time gaming, broadcast directly from a data source such a casino or other legal gaming institution.

At specific time intervals (i.e., every one, two, three, or five minutes) new games will be initiated from any and all legalized gaming institutions within RF broadcast range of the remote gaming device. A consumer is able to select, utilizing the touch sensitive buttons or pads (70 of FIG. 3) which of the different games to play from whichever of the different gaming sources available to that consumer. When a particular game has been selected, for example, a minimum one dollar blackjack game from the Bellagio Casino, a consumer's device screen, as triggered by the casino broadcast, might present certain optional textural information to the consumer. This information might indicate that a particular selected game is in-progress and request the consumer to please wait until the current session is terminated or, that a new game is now starting and requesting the consumer to wait for the next sequential step script. The consumer might be prompted to now "place your bet" which the consumer is able to do by activating a touch sensitive pad which in turn, records a one dollar wager on the blackjack game from the Bellagio Casino.

Upon expiration of an arbitrary time limit, a script stating "all bets closed" appears on the screen and betting activity ceases. Once the time limit has been reached to place a bet, a unique key is broadcast to every remote gaming device participating in the current game. In a manner to be described below, by matching the unique key with the local device's serial number, and utilizing a unique device specific algorithm embedded in the device, a device is "dealt" cards which the device displays in accordance with the algorithm.

The algorithm functions in a manner similar to a multi-coefficient encoding key which is mathematically combined with the device's serial number in order to generate a unique and completing random set of decoding coefficients. As a data source (a casino) broadcasts a particular "card" to all of the users participating in the game, each user's device will receive that "card" and interpret it solely in accordance with its own decoding coefficient. Accordingly, it should be understood that if a casino broadcasts a "card" it is actually broadcasting an arbitrary character that corresponds to a particular one of a fifty-two card deck (in the case of a poker game). Manipulating each character by a device specific decoding coefficient causes each device to interpret the "card" character as a different card, such that the casino need only broadcast one character which is in turn, represented as any one of fifty-two different playing cards on any particular remote gaming device.

In sequence, or however this particular game is played, the dealer will also be dealt cards but, since the parameters of the game are known to each device, the dealer cards are not processed in accordance with the algorithm. Thus, each individual remote device user is playing directly against the same house/dealer hand, but each remote device user is dealt a randomly different "hand" by operation of the embedded algorithm on each broadcast character.

Game play proceeds until the game process steps are complete, with each user's device able to record their "hand" as it is played against the house/dealer "hand." Virtual poker software is very well understood by those having skill in the art and is indeed, pervasive across many commonly used platforms currently available. Thus, the software is easily able to determine whether or not a particular user's "hand" has or has not beaten the "house." If the user is a loser, the amount of the bet (i.e., one dollar) is decremented from their existing credit balance, with the transaction recorded in device memory (66 of FIG. 3). If the user wins, the amount of the bet is added to the user's credit balance, with the transaction again being recorded in device memory.

Figure 5A:
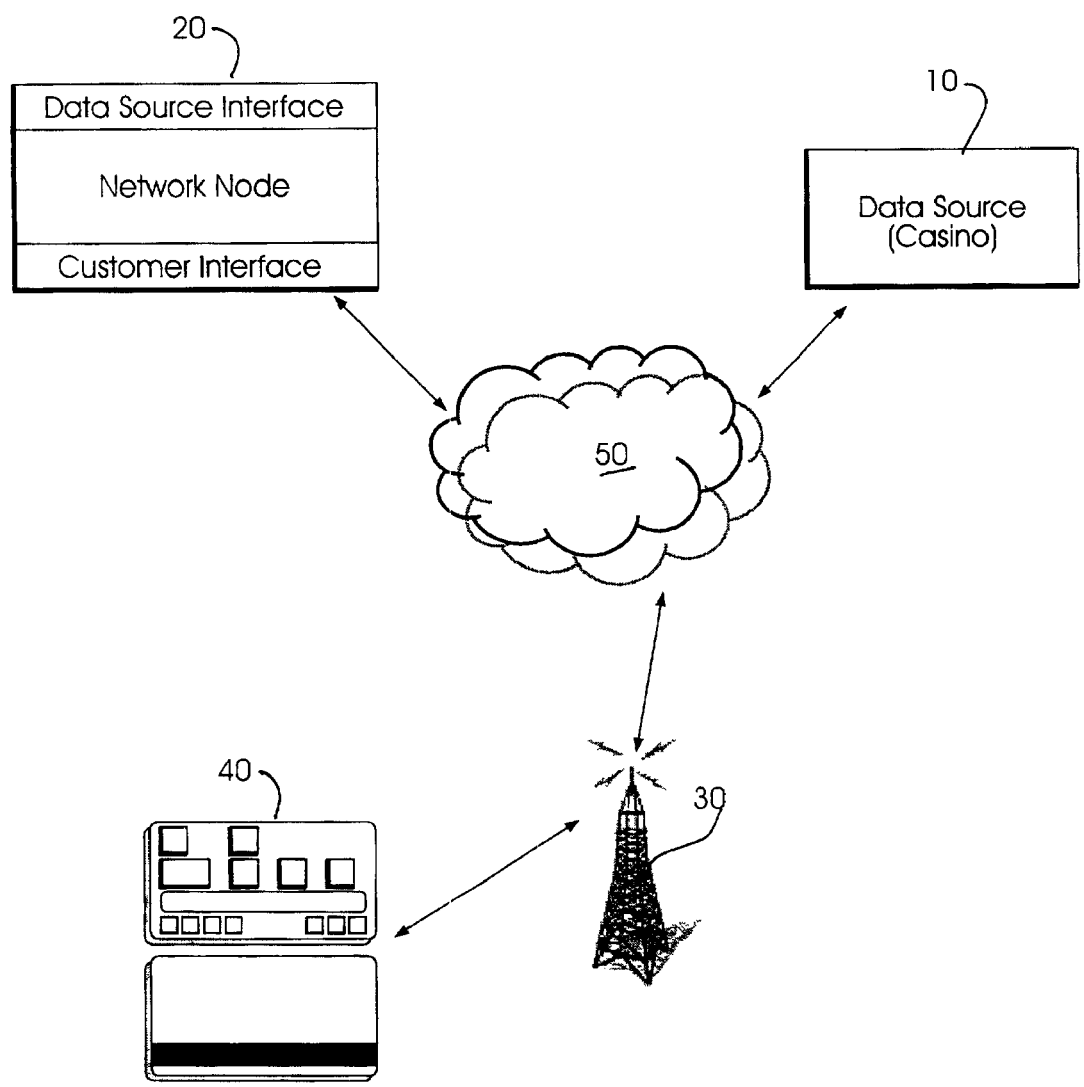
FIG. 5a is a simplified, block level diagram of a gaming device activation and cash balance addition procedure.
Figure 9A:
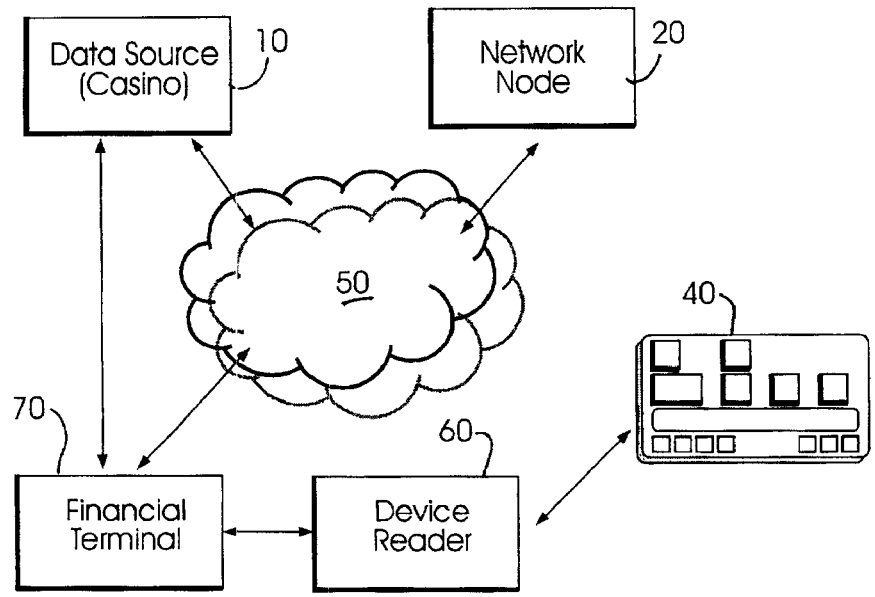
FIG. 9a is a simplified, block level diagram illustrating a cash/credit redemption procedure.
Figure 9B:
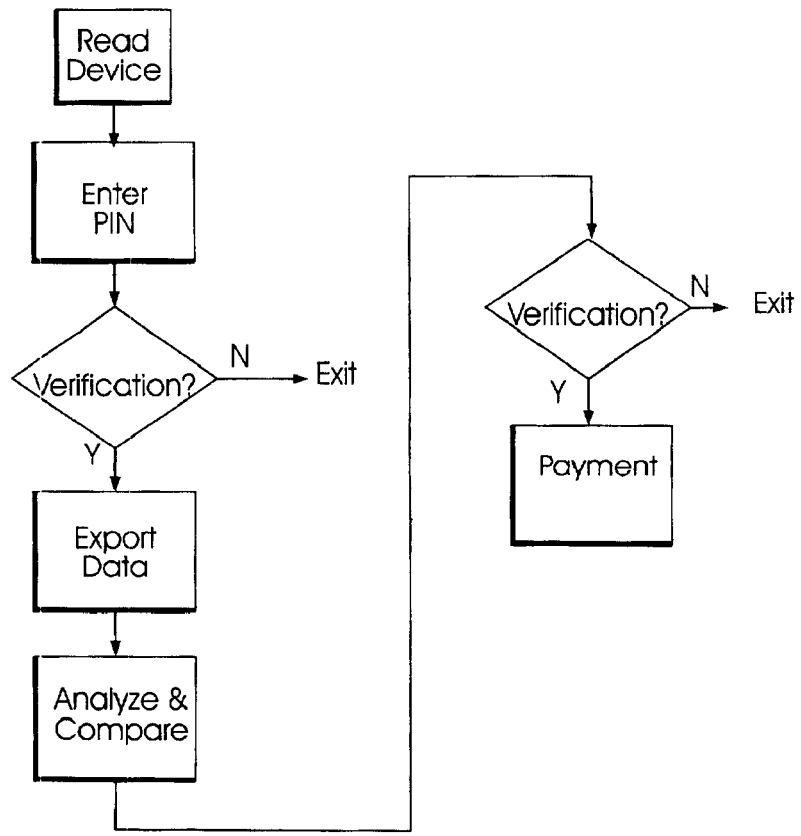
FIG. 9b is a simplified flow diagram illustrating a cash/credit redemption procedure in accordance with the principles of the present invention.

With reference now to the exemplary embodiments of FIG. 9a and b, if a user depletes the total credit balance recorded on their remote gaming device, they may follow a substantially similar process to that described in connection with device activation and cash balance addition discussed in connection with FIGS. 5a and b, above. A consumer may follow a generally similar process in order to add additional funds to device memory, by means of any accessible device reader coupled to a financial terminal or by utilizing an Internet or telephonic communication connection to a network node.

In the context of the present invention, it is contemplated that a consumer may utilize a device reader coupled to a financial terminal at an authorized data source (a casino or retail outlet) in order to cash out on any available credit balance their device memory might contain. As the device is activated by the reader, the consumer is prompted to enter their PIN number and any other information required to verify their identity. Additionally, the consumer might be required to provide verification of their age and/or device ownership. Once this information has been recorded, verified and approved, the device reader exports all of the data contained within device memory to a corresponding network node, where the data is analyzed and verified against the specific game information stored centrally. In this respect, it is important to understand that each and every game, particularly with regard to the wager amount, hand dealt, time played, and the like will be verified against a central data store. Once confirmed, the consumer collects his or her cash balance from the financial terminal (e.g., casino cashier or third party cashier).

Game specific parametric verification is an important aspect of the methodology of the present invention. "Hands" dealt by a data source, such as a casino, over the regional broadcast station are also provided to the network node over an Internet connection. "Hands" received by each device (i.e., raw card characters as well as decoded card characters) are evaluated by the network node against card characters issued by the casino. In this manner, a secure methodology is provided by which actual game play, as recorded by the device, is compared to game play as asserted by the data source. Only in the event of a true data match is a user determined to have honestly played. Hacking and fraud is thereby substantially prevented.

In a further embodiment of the present invention, it should be understood that the remote gaming device, in combination with a regional broadcast station, is uniquely suitable for supporting off-hour slot machine play. In the context of a gambling casino, casinos might implement a relatively low-power regional broadcast station somewhere about the premises, and implement the remote gaming device as a "smart" casino membership card. In this particular regard, location information is suitably broadcast as a centrum datum with an associated radium datum, so as to substantially cover the floor plan footprint of the casino at issue. If a user is indeed within the confutes of the casino premises, the card is active and the user is able to access electronic games hosted on the casino's regional broadcast station.

Slot machine play is accomplished in substantially the same fashion as "card" play as described above, but with graphical characters (slot machine icons) being transmitted to each device as opposed to "card" characters. Decoding slot machine related iconic characters is performed in the context of the above described algorithm, with the algorithm processed in combinatorial fashion with the device's unique serial number, to give a truly unique and random coding variable that is associated to each character.

In either case, it will be understood that the data source (casino) is able to broadcast a single set of game play parameters ("cards", "slot icons", "kino numbers", and the like) to each and every active device within range of its broadcast station. Each and every device will process those game play parameters in a manner that accomplishes a unique result for that particular device; a truly random gaming system, utilizing a very low bandwidth broadcast approach. For games depending on "house" participation, the house play parameters are identically presented to each device, such that multiple players are able to bet against the same "house" hand.

Thus, specific embodiments and applications of an RF enabled radio frequency communication methodology between a gaming host and a remote gaming device have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not.

What is claimed is:

1. A system, comprising:
   a broadcast station configured to transmit game play signals in accordance with instructions from a gaming source authorized to host gaming services; and
   a gaming device in communication with the broadcast station, the gaming device comprising:
      a receiver configured to receive game play signals from the broadcast station and to receive a credit balance indicative of funds available for game play;
      a memory configured to store information including the credit balance; and
      a processor in communication with the receiver and the memory, the processor configured to determine whether a physical location of the gaming device is within an authorized gaming area associated with the gaming source, and to facilitate game play based on the game play signals when the physical location of the gaming device is within the authorized gaming area and when the credit balance is greater than zero.

2. The system of claim 1, wherein the gaming device further comprises:
   a memory configured to store information comprising geographic delimiters corresponding to the authorized gaming area, wherein the processor is configured to use the geographic delimiters to determine whether the physical location of the gaming device is within the authorized gaming area.

3. The system of claim 1, wherein the gaming device further comprises:
   a receiver configured to receive position information indicative of the physical location of the gaming device.

4. The system of claim 3, wherein the processor is configured to determine the gaming device's physical location based on the position information.

5. An electronic gaming device, comprising:
   a receiver configured to receive game play signals from a broadcast station that is associated with a gaming source and to receive a credit balance indicative of funds available for game play;
   a memory configured to store information including the credit balance; and
   a processor in communication with the receiver and the memory, the processor configured to determine whether a physical location of the gaming device is within an authorized gaming area associated with the gaming source, and to facilitate game play based on the game play signals when the physical location of the gaming device is within the authorized gaming area and when the credit balance is greater than zero.

6. The device of claim 5, wherein the gaming device further comprises:
   a memory configured to store information comprising geographic delimiters corresponding to the authorized gaming area, wherein the processor is configured to use the geographic delimiters to determine whether the physical location of the gaming device is within the authorized gaming area.

7. The device of claim 5, wherein the gaming device further comprises:
   a receiver configured to receive position information indicative of the physical location of the gaming device.

8. The device of claim 7, wherein the processor is configured to determine the gaming device's physical location based on the position information.

* * * * *

UNITED STATES PATENT AND TRADEMARK OFFICE
CERTIFICATE OF CORRECTION

| | | |
|---|---|---|
| PATENT NO. | : 7,904,063 B1 | Page 1 of 1 |
| APPLICATION NO. | : 12/326877 | |
| DATED | : March 8, 2011 | |
| INVENTOR(S) | : Ryan S. Steelberg and Chad E. Steelberg | |

It is certified that error appears in the above-identified patent and that said Letters Patent is hereby corrected as shown below:

In column 1, lines 11-22,
Delete "The present application is related to and claims priority from U.S. provisional patent application Ser. No. 60/351,935, filed Jan. 24, 2002, U.S. provisional patent application entitled Method And Apparatus Using Geographical Position To Provide Authenticated, Secure, Radio Frequency Communication Between A Gaming Host And A Remote Gaming Device, filed Feb. 25, 2002, and U.S. patent application entitled Dynamic Selection And Scheduling Of Radio Frequency Communications, filed Feb. 14, 2002, all common owned with the present application, the entire contents of which are expressly incorporated herein by reference."

and

Insert -- This patent is a continuation of and claims the benefit of the priority of US patent application serial number 10/086,193, filed February 27, 2002 and entitled "Method And Apparatus Using Geographical Position To Provide Authenticated, Secure, Radio Frequency Communication Between A Gaming Host And A Remote Gaming Device", now US patent no. 7,460,863, which claims the benefit of the priority of US provisional patent application serial no. 60/351,935, filed January 24, 2002, US provisional patent application entitled Method And Apparatus Using Geographical Position To Provide Authenticated, Secure, Radio Frequency Communication Between A Gaming Host And A Remote Gaming Device, filed February 25, 2002, and US patent application entitled Dynamic Selection And Scheduling Of Radio Frequency Communications, filed February 14, 2002, all common owned with the present application, the entire contents of which are expressly incorporated herein by reference. --, therefor.

Signed and Sealed this
Twenty-seventh Day of September, 2011

David J. Kappos
*Director of the United States Patent and Trademark Office*